Jan. 14, 1969

R. H. MILLER 3,421,721

AIRCRAFT CAMERA MOUNTING

Filed Feb. 6, 1968

INVENTOR.
RAYMOND H. MILLER
BY
Dugger Peterson Johnson + Westman
ATTORNEYS

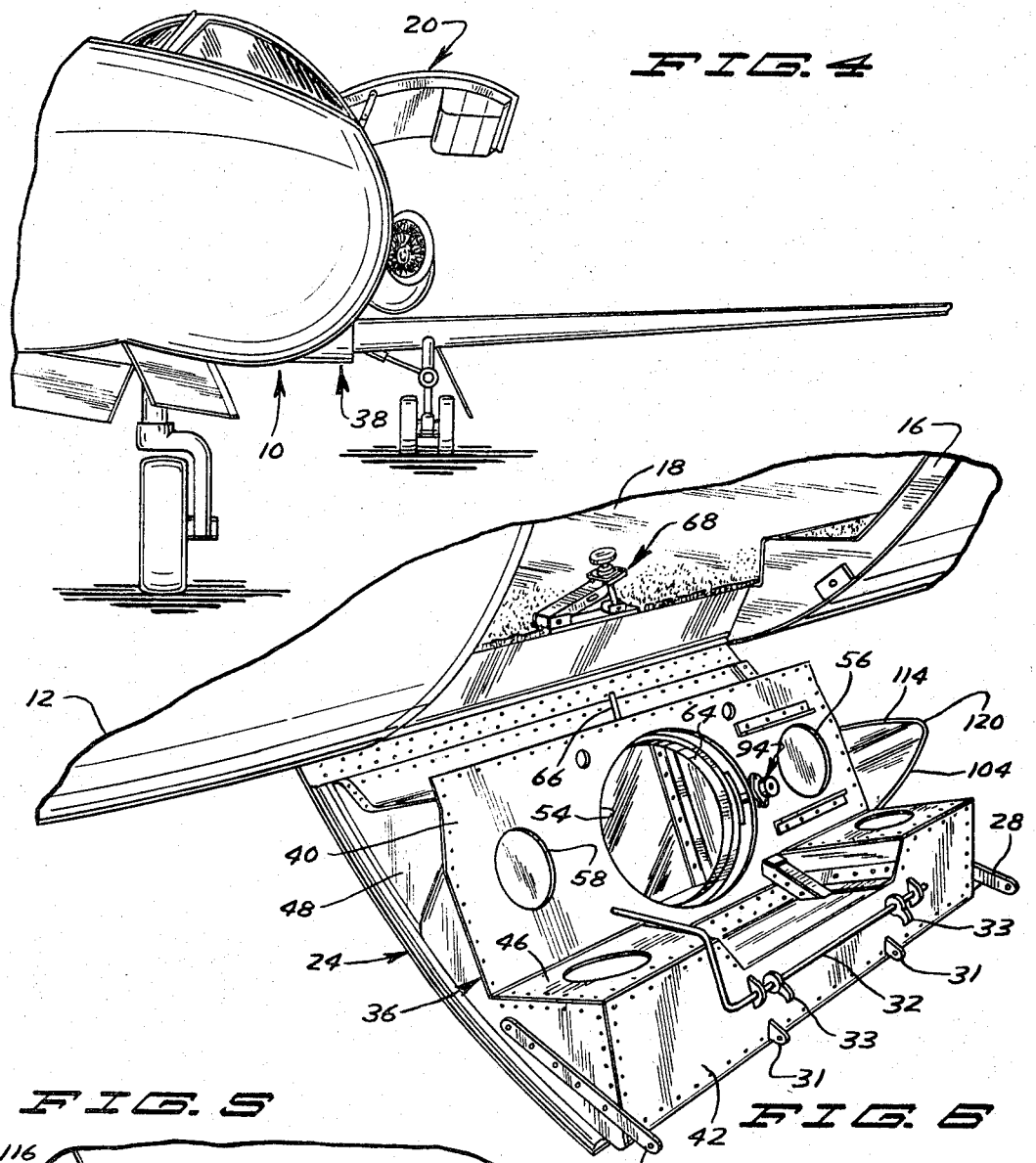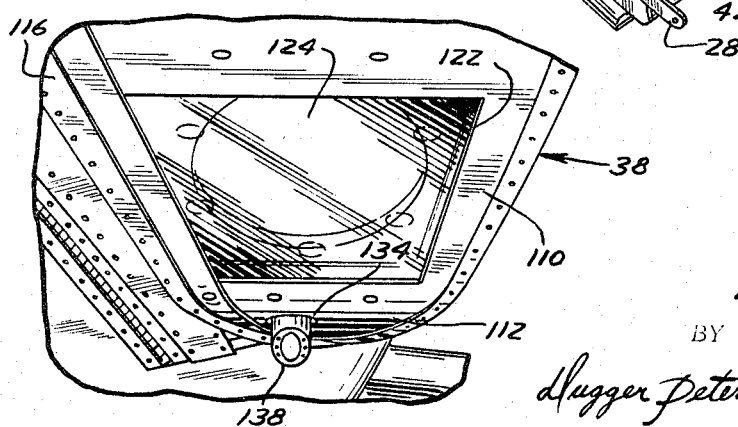

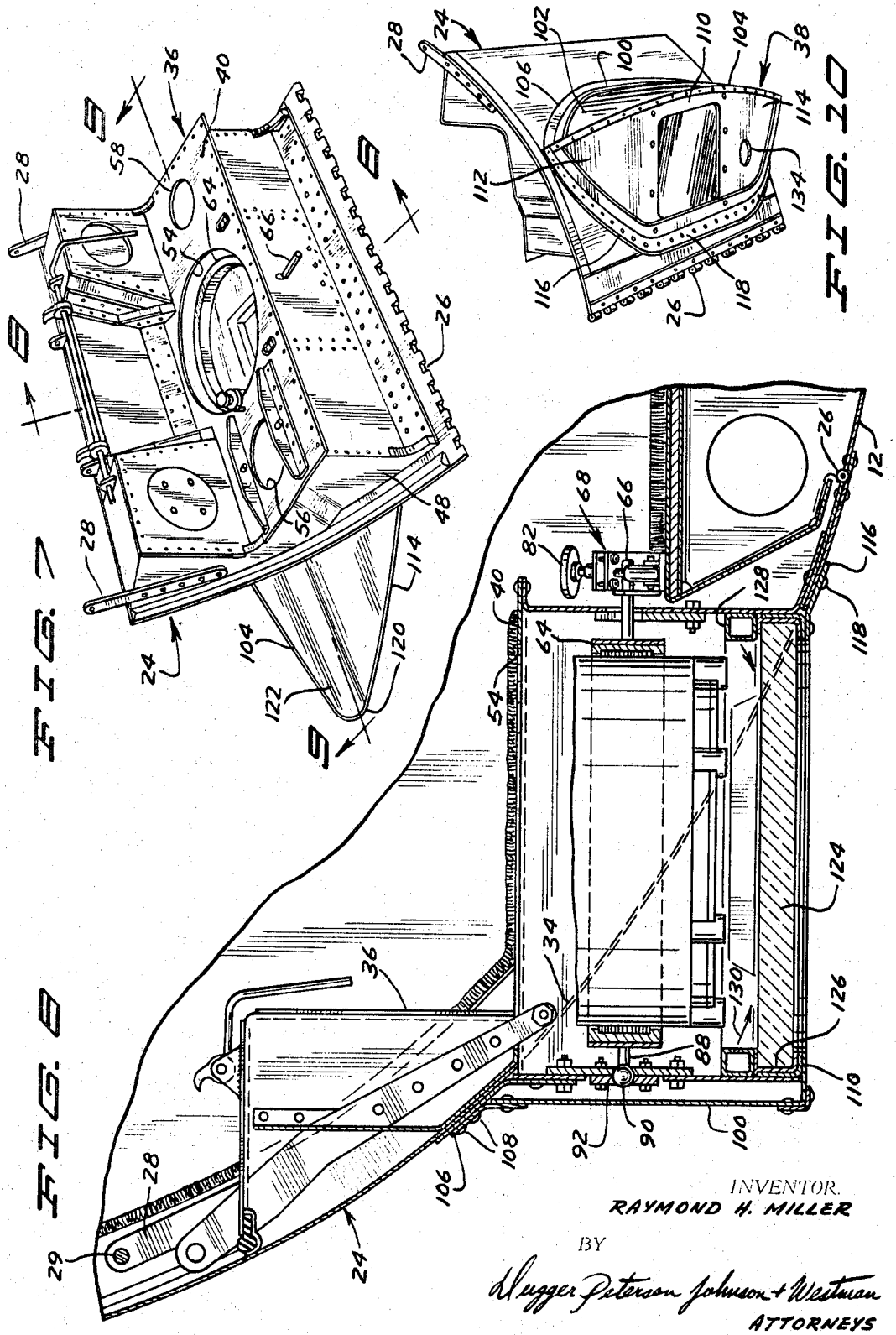

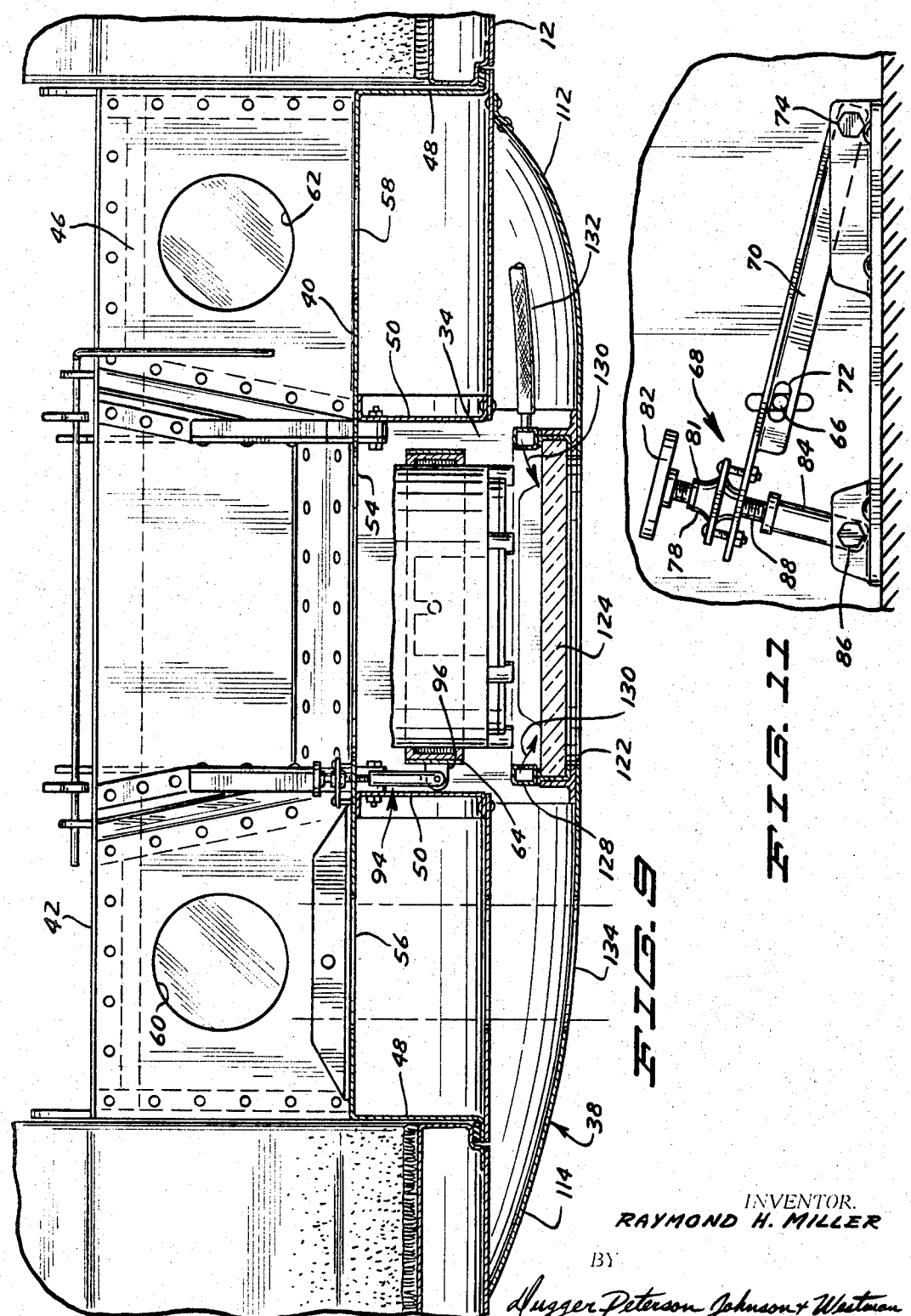

United States Patent Office 3,421,721
Patented Jan. 14, 1969

3,421,721
AIRCRAFT CAMERA MOUNTING
Raymond H. Miller, Santa Barbara, Calif., assignor to Mark Hurd Aerial Surveys, Inc., Minneapolis, Minn., a corporation of Minnesota
Filed Feb. 6, 1968, Ser. No. 703,321
U.S. Cl. 244—129
Int. Cl. B64c 1/00; G03b 29/00
12 Claims

ABSTRACT OF THE DISCLOSURE

An aircraft fuselage door, interchangeable with the aircraft's standard door or half-door, is provided with a protuberance located on the lower portion thereof. The protuberance is in the form of an aerodynamically efficient fairing having a generally flat under surface in which is disposed a downwardly facing window. On the interior of the door above said window is attached a support frame for mounting a conventional aerial mapping camera and also a drift meter. When the aircraft is to be used for purposes other than vertical aerial photography, the interchangeable door of this invention is removed and the standard door of the aircraft is replaced. The aircraft may then be used again for its certified purposes.

BACKGROUND OF THE INVENTION

Field of the invention

This invention relates generally to vertical aerial photography, and pertains more particularly to a structure for mounting the needed equipment for mapping and the like on the access door of the craft.

Description of the prior art

While special aircraft have heretofore been constructed and standard aircraft have been structurally modified for vertical aerial photography, this has normally precluded use of the aircraft for initially certificated uses. Generally speaking, medium-sized commercial planes are structurally modified so that the special equipment that is required for aerial photography may be installed within the cabin of the aircraft, the pictures being taken vertically downwardly through apertures cut in the floor or belly of the aircraft.

SUMMARY OF THE INVENTION

Functionally, the provision of permanent structural modifications of the fuselage for mounting of the equipment necessary in aerial mapping has proved quite satisfactory. However, the so modified aircraft is generally not thereafter suitable for other purposes. It will be appreciated that aerial surveys, while at times conducted frequently, are often times conducted on an infrequent basis, and the provision of specially built or modified aircraft, usable only for vertical aerial photography, such as aerial mapping, has added greatly to costs.

Accordingly, one object of the present invention is to provide a means for mounting all of the necessary apparatus required in vertical aerial photography, and more specifically aerial mapping, on a door or door section of the aircraft. By so doing, there may then be used a standard certificated aircraft, which, by mere replacement of one of its doors (or half-doors) is utilized for aerial mapping, and when the aircraft is desired for its general or certificated use, the specially constructed door is removed and the conventional door of the certificated aircraft is replaced. In this way, the aircraft, which may represent a large investment, can be operated on a more economical basis since it can always be returned to its original or certificated configuration.

Another object is to obviate the necessity for sending an entire aircraft to far-away places, especially foreign countries, when by use of the invention, only a modified door need be shipped when it is known that a particular make of aircraft capable of door-substitution, is locally available. The present invention allows such a locally available aircraft to be converted from general certificated use to aerial photography.

Another object of the invention is to provide a detachable means, more specifically an aircraft door or door section, that will accommodate conventional aerial mapping cameras and accessory equipment.

A further object of the invention is to provide means for mounting an aerial camera in the door of an aircraft in such a way as not adversely to affect the aircraft's aerodynamic characteristics, thereby permitting the invention to be employed on high-speed aircraft such as jet planes. Employment of the invention in pressurized jet aircraft operated at high altitudes permits aerial mapping activity at high altitudes requiring cabin pressurization and heating. The invention has for an aim the maintenance of the requisite sealing action so that the desired degree of pressurization and temperature may be maintained at all times.

Briefly stated, the present invention is concerned with the mounting of an aerial camera on an interchangeable part of an airplane, more specifically a curved door section thereof, so that the camera can be aimed in a truly vertical direction and thereby allow the usual overlapping photographs to be readily taken. In this way, a standard aircraft having upper and lower curved door sections, can be very rapidly converted for aerial photography service, the conversion being only of a temporary nature and accomplished at an extremely low cost.

BRIEF DESCRIPTION OF THE DRAWINGS

FIGURE 4 is a fragmentary perspective view taken generally from the front of the aircraft for the purpose of illustrating the minimal amount of protuberance from the circular fuselage configuration;

FIGURE 5 is a fragmentary bottom perspective view of the fairing assembly with the camera and drift meter in place, the view looking rearwardly and taken at an upward angle;

FIGURE 6 is a perspective view of the lower door section in its open position, there being no camera or drift meter installed in order to depict to better advantage the construction of the support assembly secured to the inside face of the door;

FIGURE 7 is a perspective view of the door itself, the view corresponding to FIGURE 6, but illustrating the streamlined projecting rear portion of the fairing;

FIGURE 8 is a sectional view taken in the direction of line 8—8 of FIGURE 7 but with upper and lower portions of the fuselage added thereto;

FIGURE 9 is a sectional view taken in the direction of line 9—9 of FIGURE 7 but with fore and aft portions of the aircraft's fuselage added;

FIGURE 10 is a perspective view of the door and the

FIGURE 11 is an elevational detail of one of the mechanisms for adjusting the camera, this particular mechanism causing the camera ring to tilt about the longitudinal axis of the aircraft.

DESCRIPTION OF THE PREFERRED EMBODIMENT

Figure 1:
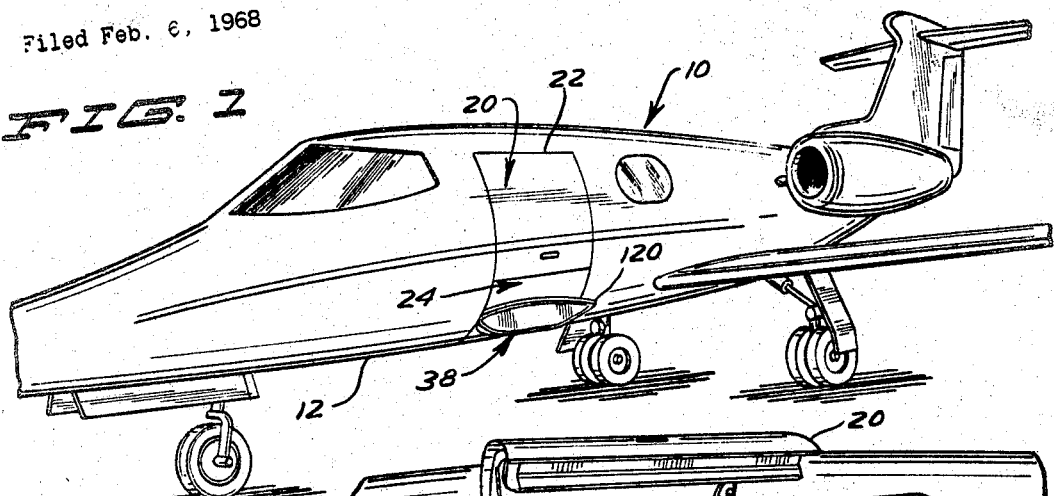
FIGURE 1 is a perspective view of an aircraft equipped with the door construction of the invention, the fairing assembly on the exterior on the door being discernible.

Referring first to FIGURE 1, the aircraft designated generally by the reference numeral 10 that has been selected for illustrating the invention is a Lear jet airplane, this type of aircraft being ideally suited to the invention because its generally circular fuselage or body 12 includes an outer aluminum skin. Actually, the fuselage further comprises bulkheads and longitudinal stringers but these structural elements are of conventional construction in modern-day airplanes and are not concerned with a practicing of the invention. As can be seen from FIGURES 2, 3 and 6, a door frame 16 forms an access opening 18. It will be appreciated that the frame 16 and the access opening 18 curve upwardly and downwardly from a generally horizontal plane passing through the center of the fuselage 12. However, the frame terminates in a spaced relationship from a vertical plane passing through the center of the fuselage. Hence, the access opening 18 does not extend through a complete 180 degrees but subtends an arc, particularly at the lower end thereof, which tangentially approaches a horizontal plane that would be tangential to the fuselage circle at the bottom or belly of the airplane 10.

An upper door panel or section 20 is hinged at 22 to the fuselage 12 adjacent the top sill of the door frame 16. In a generally similar manner, a lower door panel or section 24 is hinged at 26 to the fuselage 12 adjacent the bottom sill of the door frame 16. Hence, the door section 20 swings upwardly and the door section 24 swings downwardly as can be readily appreciated. The lower door section 24, as best seen in FIGURES 6, 7 and 8, is equipped with hangers 28 at the opposite sides thereof which are apertured so as to have latch pins 29 (one shown in FIGURE 8) extend therethrough into holes 30 which are formed in the door frame 16. There are auxiliary hangers 31 intermediate the hangers 28, these hangers also allowing the lower door section 24 to be firmly latched to the upper door section 20. Still further, an L-shaped rod 32 with hooks 33 thereon assists in locking the door sections together in a manner such that they will be kept locked when in flight.

From the information given above, it will be appreciated that the aircraft 10 has door means comprised of two sections 20, 24 in the exemplary situation. Normally, the upper door section 20 is just as it appears, and the lower door section 24 in its standard form, contains on the inner side thereof steps or stairs so that ingress and egress can be more readily accomplished. However, it is the lower door section 24 that has been modified from its conventional, stepped construction. The modification will now be described in detail.

First, attention is directed to FIGURES 8 and 9 which show an aperture 34 in the door section 24, the aperture 34 being of a size sufficient to accommodate the cone of the camera yet to be referred to. Secured to the interior of concave side of the lower door section 24 is a camera support assembly denoted by the reference numeral 36. On the exterior or convex side of the lower door section 24 is fixedly mounted a fairing assembly 38.

The support assembly 36 includes a frame comprising a main horizontal platform 40 of sheet metal and an elevated platform 42. Extending upwardly from the lower door section 24 is a riser panel 44 that connects with the inner edge of the platform 40; similarly, a riser panel 46 connects the outer edge of the platform 40 with the inner edge of the platform 42. Also, end walls 48 are provided. A pair of inside bulkheads 50 can have somewhat the same configuration as the end walls 48. Suitable screws or rivets can be utilized for securing these various sheet metal parts together. The main platform 40 is formed with a central opening 54 and is flanked by smaller auxiliary openings 56, 58. Additionally, holes or openings 60, 62 are formed in the riser 46, thereby providing entranceways to small wiring compartments.

In precision aerial photography, it is necessary to provide the camera with a mounting that permits adjustments for tip, tilt and crab. Hence, a gimbal or trunnion type of adjustment is employed. In this regard, it will be perceived that a ring 64 appears in certain of the views, particularly FIGURES 8 and 9. There is a stub shaft 66 that projects outwardly from the ring 64, being received in a jack mechanism 68. The jack mechanism 68, as best seen in FIGURE 11, includes an elongated bracket member 70 having a slot 72 into which the stub shaft 66 projects. The bracket 70 is hinged to the floor of the aircraft 10 at 74. Bolted to the bracket at the end thereof opposite the hinge 74 is a suitable bearing labeled 78. Extending loosely through the bearing is a shaft 80 having shoulders integral therewith, such as the shoulder 81, so that the shoulders bear against the upper and lower sides of the bearing 78. The shaft 80 is rotatable through the agency of a knob 82. The lower portion of the shaft is threadedly received in a tubular element 84 which is pivoted or hinged at 86 to the aircraft floor. Diametrically opposite the stub shaft 66 is a second shaft 88 which is integral with the ring 64 at one end and which carries a ball element 90 at its free end. The ball 90 is received in a socket at 92. When the jacket mechanism 68 is actuated, it will be understood that owing to the ball and socket mounting at 90, 92 there will be a tilting of the camera ring 64 about a fore and aft longitudinal axis of the aircraft 10. To tilt the ring 64 about a transverse axis, that is an axis provided by the shafts 66 and 88, the second jack mechanism 94 is employed which is quite similar to the mechanism 68. The jack mechanism 94, as can be perceived from FIGURE 9, is suspended from the platform 40 and is pivotally connected at its lower end to a clevis 96 integral with the ring 64. Since the two jack mechanisms are quite similar, it is thought that the functioning of the jack mechanism 94 should be evident without further explanation. When its knob is operated, the jack mechanism through the connection at 96 to the ring 64 tilts the ring about a transverse axis. Consequently, there are available two distinct adjustments so that the ring 64 can be tilted or rocked about the intersecting axes so as to allow the camera to be properly adjusted through the required angles in making the aerial photographs.

Passing now to a detailed description of the fairing assembly 38, it will be noted that the assembly includes a side section 100 having curved opposite end portions 102 and 104. Also, the side section 100 has a flange 106 for attachment to the sheet metal paneling of the door section 24, through the agency of appropriate screws or rivets 108. The fairing assembly 38 further includes a bottom section 110 having curved opposite end portions 112, 114. Here again, the section 110, as with the section 100, is provided with an attaching flange 116 and suitable screws or rivets 118 are resorted to in effecting its securement. From FIGURES 1 and 2 it will be perceived that the fairing assembly 38 extends rearwardly beyond the rear edge of door section 24, terminating in a relatively sharp rear point labeled 120. As is apparent from FIGURE 7, the extension or projection of the point 120 leaves a triangular opening 122 that will confront a portion of the fuselage 12 when the lower door section 24 is swung upwardly into its closed position.

As readily understandable from FIGURES 5 and 9, the bottom section 110 has a lower flat region. It is in the relatively flat region that a window opening 122 is cut. Closing the otherwise open window 122 is a ground glass plate 124 that is held in a fixed mounting rim 126. The mounting rim 126 appears best in FIGURE 8. It will be recognized that the rim 126 is held in a fixed relationship with the bottom section 110. Just above the glass plate 124 is a warm air nozzle ring 128 for directing air onto the glass plate 124 in the direction of the arrows 130 to eliminate frosting of the glass plate, there being an air supply conduit 132. Also, as can be discerned from FIGURES 5, 9 and 10, there is a hole 134 for the projection of the lower end of a drift meter. This hole 134 is in alignment with the previously mentioned auxiliary opening 56 formed in the horizontal platform 40.

Figure 3:
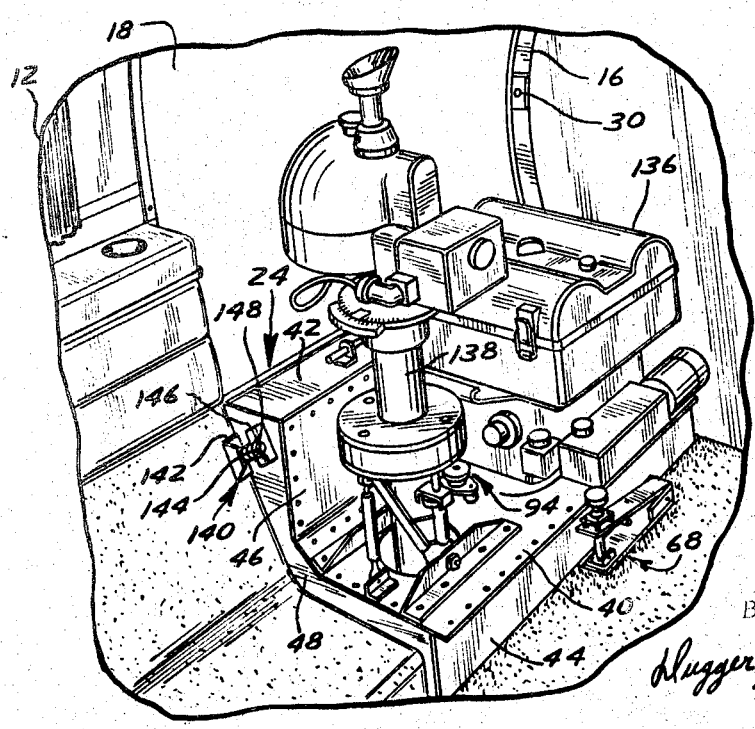
FIGURE 3 is a perspective view taken inside the cabin of the aircraft illustrating the drift meter and camera mounted on the support assembly which is secured to the inside of the door, the lower door section being locked in its closed position.

FIGURE 3 illustrates a conventional aerial mapping camera which has been denoted generally by the reference numeral 136. Also, this same figure pictures to good advantage an accessory in the form of a drift meter 138, although it will be appreciated that such an instrument may constitute a combined drift meter and interval finder device, and a portion of this accessory equipment projects downwardly through the hole 134. A suitable seal surrounds the lower portion of the drift meter 138 so as to assist in maintaining the pressurization within the cabin and also to prevent heat loss from the cabin's interior.

FIGURE 3 shows a clamp 140, there being actually two such clamps 140 but only one being visible in this particular view. The clamp 140 is composed of a pressure foot 142 having a threaded shank 144 which passes upwardly through an apertured pad 146 that is attached to the particular end wall 48 appearing in this figure. A nut 148 allows the foot 142 to be pressed against the inside of the cabin and in this way the door section 24 which carries added weight by reason of the camera 136 and the drift meter 138 is more positively held against inadvertent or accidental opening. In other words, the utilization of two clamps 140 is an added precautionary measure that is taken because of the extra weight or load applied to the door section 24.

From the information herein presented, the benefits to be derived from the practicing of my invention should be manifest. Whatever door is standard for the particular type of aircraft that is to be employed in conducting the aerial survey will have a replica thereof made with an aperture 34 therein of appropriate size. The support assembly 36 is secured to the inner or concave side of such door and the fairing assembly 38 is secured to the outer or convex side thereof. Whenever the aircraft is to be employed for aerial mapping, the standard door is removed and the door modified in accordance with the teachings of the present invention is substituted therefor. As can be readily appreciated, this only entails the demounting of the lower door section or panel 24 in the illustrated instance. This requires only the detachment of the hinge 26 which would obviously be the same type of hinge utilized for the permanent door. With the hinge pin (not shown) removed, the standard door can be taken off and the door herein described substituted therefor.

Figure 2:
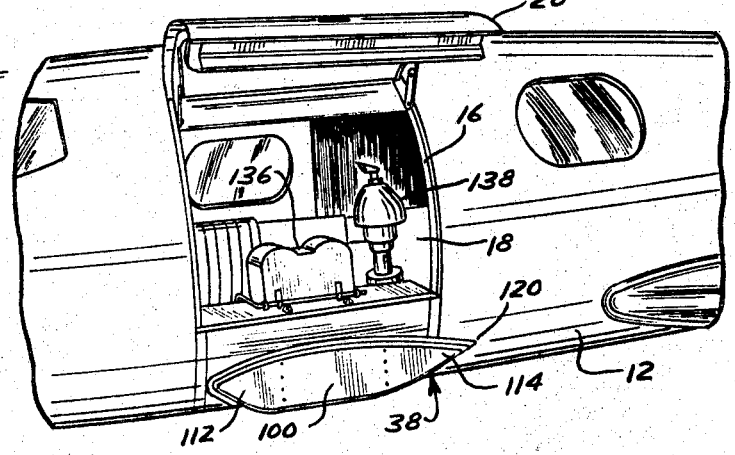
FIGURE 2 is a fragmenetary side elevational view with the upper door section open and the lower door section closed, the camera and drift meter being visible through the access opening.

With the door section 24 in place, the camera 136 can be readily lowered into the opening 54 so that it rests on the ring 64, which ring as hereinbefore explained can be angularly adjusted by means of the jack mechanisms 68, 94 as circumstances require. Likewise, the drift meter 138 can be placed in the opening 60 so that the lower end thereof projects through the hole 134 as can be seen in FIGURE 2.

When the mapping operation is completed, the camera 136 and drift meter are removed. The door section 24 is then taken off and the standard door section for the particular aircraft is again employed, thereby permitting the plane to be used for the various purposes for which it has been certificated.

It will be appreciated that while the access door means in the illustrated instance is composed of two door sections 20 and 24, the invention is applicable to aircraft utilizing a single door for closing an access opening. Owing to the generally circular cross-section of the fuselage in the majority of aircraft designs, virtually all doors, whether they be in one piece or in two sections (as herein depicted), have sufficient curvature so that the fairing assembly 38 need not create an objectionable amount of aerodynamic drag as long as the curvature configuration herein taught is adopted. Hence, the degree of protuberance results in only what might be termed a minor blister or bubble.

I claim:

1. In an aircraft comprising a fuselage having a curved cross-section provided with a generally laterally facing access opening in one side thereof, a door for normally closing at least a portion of said access opening, said access opening and said door conforming to a segment of the fuselage curvature thus formed and said door having a downwardly opening aperture therein, first means for removably mounting said door on the fuselage in a position to close at least a portion of said access opening, and second means secured to said door for mounting a camera in juxtaposition with said aperture so that the camera will be supported by said door during flight to allow taking of aerial photographs downwardly through said door aperture in a substantially vertical direction.

2. The apparatus of claim 1 further characterized in that the second means includes third means for supportingly holding a camera, and means connected to the third means for adjusting the third means to selectively vary the tip, tilt and crab of a camera supported thereby and retain the third means in the adjusted position.

3. The apparatus of claim 1 further characterized in that the third means comprises a platform that is generally horizontal when the door is in a closed position, said platform having an opening aligned with the door aperture.

4. In an aircraft comprising fuselage having a curved cross-section provided with a generally laterally facing access opening in one side thereof, a removable door normally closing at least the lower portion of said access opening, said access opening and said door conforming to a segment of the fuselage curvature thus formed and said door having a downwardly opening aperture therein, and means secured only to said door for mounting a camera in juxtaposition with said aperture so that the camera will be supported solely by said door during flight to allow taking of aerial photographs downwardly through said door aperture in a substantially vertical direction.

5. The aircraft of claim 4 further characterized in that there is a fairing assembly attached to the outside of said door, said fairing assembly providing a viewing window residing in a generally horizontal plane when said door is closed.

6. The aircraft of claim 5 further characterized in that said viewing opening extends outwardly from the fuselage curvature so that the outer edge of said viewing opening lies outwardly of said fuselage and therebeneath.

7. In an aircraft having an access opening in one side thereof, said aircraft including a fuselage having a generally curved cross-section adjacent said access opening, door means normally closing said access opening, said door means having an aperture therein, said access opening and door means conforming to a segment of the fuselage curvature thus formed and said door means aperture being located in the lower portion of said door means, a fairing assembly attached to the outside of said door means including sheet material extending outwardly from the fuselage curvature and upwardly to form a protuberance closing said door means aperture, said fairing assembly providing a viewing opening residing in a generally horizontal plane when said door means is closed and extending outwardly from the fuselage curvature so that the outer edge of said viewing opening lies outwardly of said fuselage and faces downwardly therebeneath, said fairing assembly having a glass plate closing said downwardly facing viewing opening.

8. The aircraft of claim 7 further characterized in that the fairing assembly extends rearwardly from said door means and converges to a point that confronts the fuselage when said door means closes said access opening.

9. A door for the access opening of an aircraft comprising curved panel means having a concave configuration at one side thereof and a convex configuration at the other side thereof, said panel means having an aperture therein, camera support means secured to the concave side of said panel means and projecting therefrom, and fairing means secured to the convex side of said panel means and projecting therefrom, said support means and said fairing means each having an opening therein in general alignment with and spaced from said aperture so that pictures may be taken vertically downwardly therethrough when a camera is mounted on said support means.

10. The door of claim 9 further characterized in that said support means includes a flat platform section on which the camera is to be mounted and said fairing means includes a flat bottom section spaced from and disposed generally parallel to said platform section, said opening in said support means being in said flat platform section and said opening in said fairing means being in said bottom section.

11. The door of claim 10 further characterized in that said fairing means includes a glass plate closing said opening in said flat bottom section.

12. A door for the access opening of an aircraft comprising curved panel means having a concave configuration at one side thereof and a convex configuration at the other side thereof and a convex configuration at the other side thereof, said panel means having an aperture therein, support means secured to the concave side of said panel means, and fairing means secured to the convex side of said panel means, said fairing means having a generally horizontal window so that pictures may be taken vertically downwardly therethrough when a camera is mounted on said support means, said fairing means including two sections of sheet material, one section constituting a bottom and the other a side portion, the ends of said sections curving toward said panel means and said bottom section having a relatively flat region in which said window is located, one of the ends of each said section projecting beyond one edge of said panel means and forming a sharper point than the other ends of said sections.

References Cited

UNITED STATES PATENTS

| | | | |
|---|---|---|---|
| 2,242,201 | 5/1941 | Woods | 244—129 |
| 2,942,813 | 6/1960 | English | 244—129 |

FOREIGN PATENTS

| | | |
|---|---|---|
| 534,761 | 3/1941 | Great Britain. |
| 725,914 | 8/1942 | Germany. |

MILTON BUCHLER, *Primary Examiner.*

JAMES E. PETTINGER, *Assistant Examiner.*

U.S. Cl. X.R.

95—12.5; 352—132